April 18, 1933.  B. T. BROOKS  1,904,200
PROCESS OF PRODUCING AND DISTILLING AQUEOUS SULPHURIC
ACID SOLUTIONS OF SECONDARY AND TERTIARY ALCOHOLS
Filed June 30, 1931  2 Sheets-Sheet 1
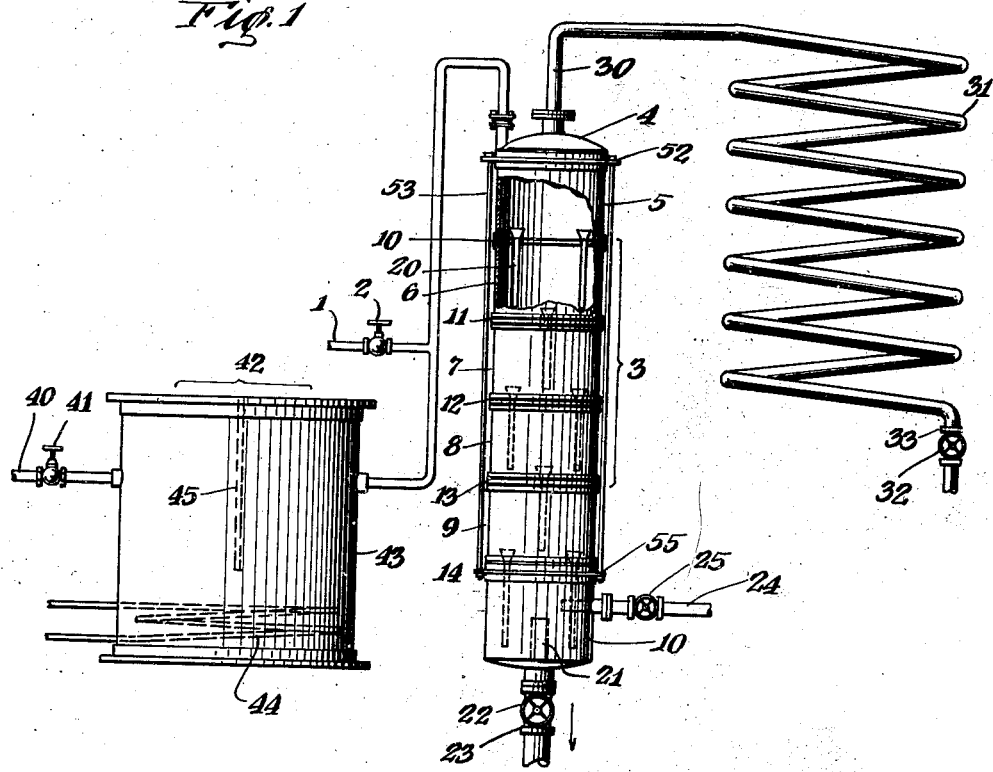
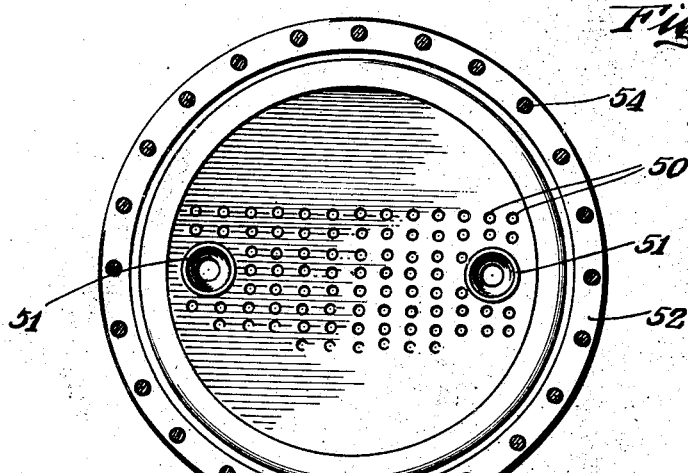
INVENTOR
Benjamin T. Brooks
BY his ATTORNEY
Louis Burgess

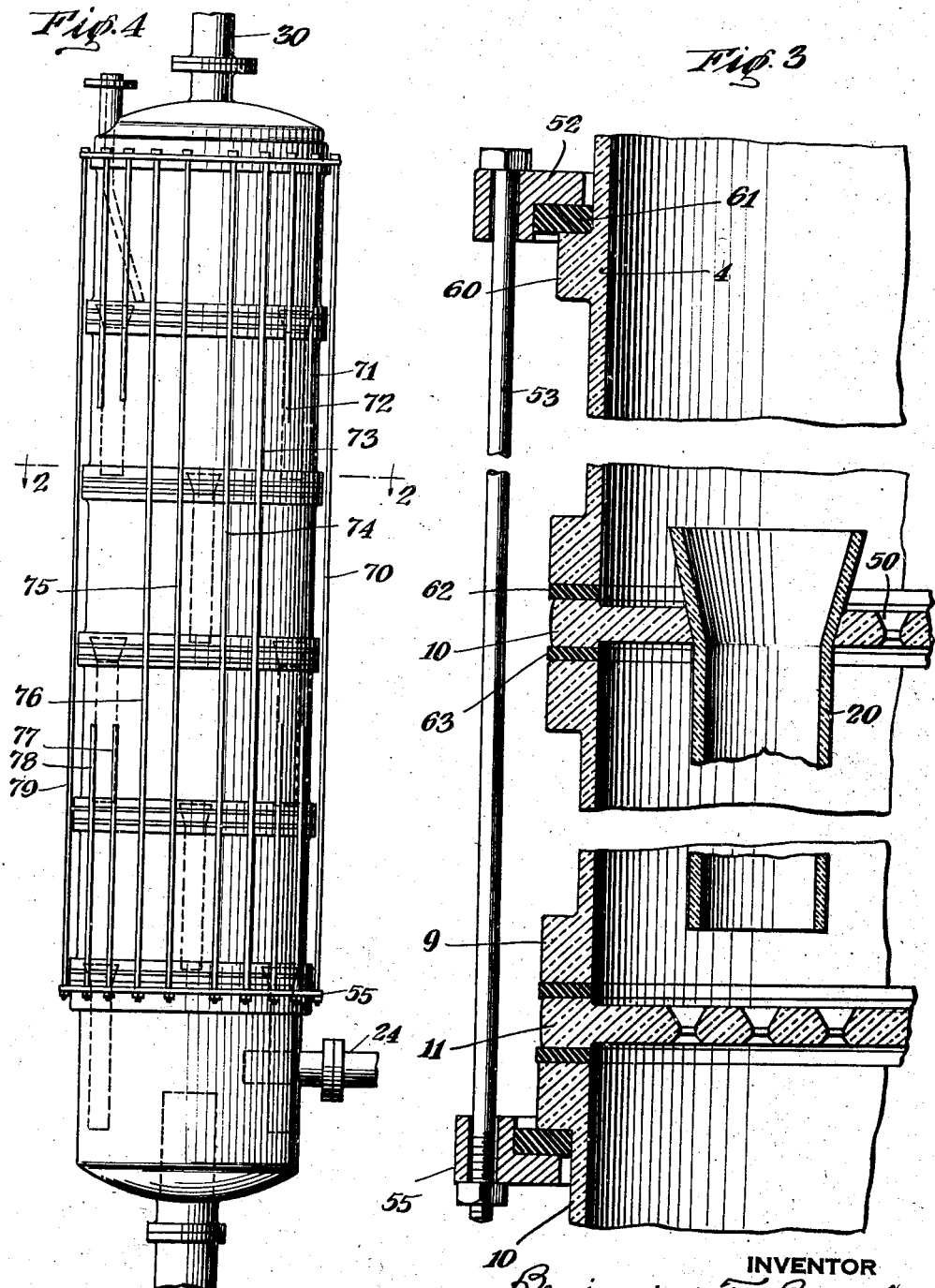

Patented Apr. 18, 1933

1,904,200

UNITED STATES PATENT OFFICE

BENJAMIN T. BROOKS, OF GREENWICH, CONNECTICUT, ASSIGNOR, BY MESNE ASSIGNMENTS, TO STANDARD ALCOHOL COMPANY, OF WILMINGTON, DELAWARE, A CORPORATION OF DELAWARE

PROCESS OF PRODUCING AND DISTILLING AQUEOUS SULPHURIC ACID SOLUTIONS OF SECONDARY AND TERTIARY ALCOHOLS

Application filed June 30, 1931. Serial No. 547,896.

This invention relates to the production and distillation of aqueous sulphuric acid solutions of secondary and tertiary alcohols.

The secondary and tertiary alkyl sulphates are commercially manufactured by the treatment with aqueous sulphuric acid of olefines derived from the cracking of hydrocarbon substances, such as mineral oils. The alkyl sulphates so formed are ordinarily diluted and distilled for the production of the corresponding alcohols. My invention is particularly applicable to the processes of dilution and distillation.

At the present time such distillations are ordinarily carried in apparatus lined with lead, the distillation being carried to the extent of driving overhead in vapor form the major part of the alcohol while leaving a liquid residue in the still consisting of aqueous sulphuric acid. I have discovered, however, that where the distillation is carried out in this manner, or in apparatus lined with metal generally, the maximum yield of alcohol is not obtained, due to the formation of large proportions of olefine by the decomposition of the alcohol or alkyl sulphate. These losses may, however, as I have found, be materially inhibited or reduced by carrying out the distillation while retaining the liquid by surfaces of a vitreous character. Whereas in the prior art the liquid is retained by metal surfaces and especially by lead, the retaining metal surfaces appears to exert a catalytic influence which promotes the degradation of the alcohol to the less desirable products hereinbefore mentioned.

The term "vitreous", as herein employed, includes vitrefied earthenware bricks, such as acid proof bricks which may be properly bonded by acid resisting cement to form a continuous interior surface, stoneware and glass.

It is of further advantage to heat the liquid undergoing distillation by the direct introduction of steam into the liquid to be distilled. A further improvement in percentage of alcohol recovered and in quality of the alcohol obtained is effected by carrying out the fractional distillation or separation of the alcohol from the mixture by the use of a stripping column in contradistinction to a batch distillation. This embodiment of the invention will be illustrated by reference to the drawings, in which, Fig. 1 is a side elevation with parts in section of apparatus in which the invention may be carried into effect.

Fig. 2 is a top view of a part of the construction shown in Fig. 1.

Fig. 3 is a detailed vertical section through part of the construction shown in Fig. 1, and Fig. 4 is a side elevation of the column shown in Fig. 1, showing in addition the mode of strapping the sections of the column together.

Referring to Fig. 1, the mixture, containing a secondary or tertiary alcohol and aqueous sulphuric acid, may be introduced through pipe 1, controlled by valve 2, to the stripping column 3. As hereinbefore stated, the surfaces of the stripping column in contact with the liquid contents thereof are constructed of vitreous materials; and in the preferred embodiment of my invention illustrated, the column 3 is constructed of glass. The column comprises the vapor dome 4, the cylindrical sections 5, 6, 7, 8 and 9, and the connected base 10. The column is provided with horizontal partitions or plates which span the same and which carry a liquid layer or pool, but in this case the partitions are constituted by the horizontal glass disks 10, 11, 12, 13 and 14, intermediate the cylindrical sections and properly gasketed to the said sections to prevent leakage from the column. Each partition carries an overflow pipe, such as 20, (Fig. 1) which projects above the surface of the partition and thereby operates to predetermine the level of the pool of liquid accumulated on the surface of the partition.

The liquid introduced through the pipe 1 passes downwardly from plate to plate and is finally withdrawn from the base of the column by means of the overflow 21 and the connected educt 22, controlled by the valve 23. The column is heated adjacent the base by the direct introduction of steam through the pipe 24, controlled by the valve 25. The steam operates to heat the liquid in the base of the column and in addition the pool of liquid on the upper surface of the partition 14. Each upward section of the column is in turn heated by vapors evolved from the section beneath, and for this purpose each partition 10 to 14 inclusive carries some appropriate means for distributing ascending vapors throughout the body of the pool of liquid retained on the upper surface of the partition. Ordinarily, bell-caps of vitreous material may be employed, although I find perforations in the partition to be suitable for this purpose, and are, of course, simpler and easier to fabricate. Alcohol vapors are taken off overhead from the top of the column through the pipe 30 wherein the same are condensed, the resulting alcoholic condensate being withdrawn from the system through the pipe 32, controlled by the valve 33. As the mixture of alcohol and sulphuric acid cascades downwardly through the column from plate to plate, it becomes progressively impoverished in alcohol. It will be seen, therefore, that the space between any two adjacent partitions 10 to 14 inclusive defines a zone containing liquid and vapor, and that these zones are at progressively higher temperatures as the base of the column is approached.

Where the alkyl sulphate treated is readily hydrolyzed, it is sufficient to dilute the same with water and feed the mixture so produced immediately into the stripping column. This is the case, for example, with tertiary butyl sulphate which may be diluted with about one volume of water and supplied immediately to the column through the pipe 1. There are other alkyl sulphates which do not hydrolyze so readily and which for optimum yields should be diluted and warmed for a suitable period prior to the introduction of the mixture to the stripping column. Secondary butyl sulphate is an example of the latter type. In such a case the alkyl sulphate is diluted with a suitable quantity of water, say for example from one to three volumes, and introduced to the pipe 40, controlled by the valve 41 to the digesting or hydrolyzing chamber 42. This may consist of a receptacle 43 which may be of acid resistant metal, although it is preferably of vitreous material, heated by means of the steam coil 44, and preferably provided with a baffle such as 45. The time and temperature to which the mixture is subjected in the hydrolyzing vessel 42 should be sufficient to effect the substantially complete hydrolysis of the alkyl sulphate, thereby producing therefrom a mixture consisting predominantly or exclusively of alcohol and sulphuric acid. In the case of secondary butyl alkyl sulphate, I have found that a temperature of between 75 and 80° C. and a time of about one-half hour is sufficient for this purpose. The temperature should, in any event, be below the boiling point of the alcohol to be produced.

In Fig. 2, I have shown a top view of the stripping column 43 with the dome 4 removed. This illustrates the general arrangement of vapor outlets 50 and overflow pipes 51. The sections of the column are strapped together by means of the annular metal flange 52, connected together by means of the stay-bolts 53 of which a number are employed, passing through the various holes 54 provided for that purpose in the rings 52 and 55.

The internal construction of the column 3 is further shown in detailed section in Fig. 3, from which it will be noted that the ring 52 bears on the dome 4 of the column by the projecting integral annular shoulder 60. A resilient gasket 61 is provided intermediate the shoulder 60 and the ring 52. Resilient gaskets, such as 62 and 63, are similarly provided adjacent the top and bottom of each of the partitions, such as 10.

In Fig. 4, I have shown an exterior view of the column with the various stay-bolts 70 to 79 inclusive in place.

It will, of course, be understood that the foregoing description of method and apparatus is by way of description and not of limitation; in particular the number and dimensions of the sections composing the column may be varied over wide limits and the dimensions of the hydrolyzing vessel 42 may be suitably modified in view of the amount and character of the alkyl sulphate supplied thereto. It is my intention that the invention be limited only by the following claims or their equivalents wherein I have endeavored to claim broadly all inherent novelty.

I claim:

1. Process of selectivly distilling a secondary or tertiary alcohol from a solution containing such an alcohol and aqueous sulphuric acid, which comprises distilling the solution while retaining the same by surfaces of a vitreous character and while holding said solution substantially exclusively in contact with surfaces of a vitreous character.

2. Process of separating a secondary or tertiary alcohol from a solution containing such an alcohol and aqueous sulphuric acid, which comprises distilling the solution while retaining the same by surfaces of a vitreous character and while holding said solution substantially exclusively in contact with surfaces of a vitreous character, and maintaining the distillation by the direct injection of steam into the said liquid.

3. Process of separating a secondary or tertiary alcohol from a solution containing such an alcohol and aqueous sulphuric acid, which comprises introducing the alcohol sulphuric acid mixture into the upper part of a stripping column, heating the contents in the lower part of said column, continuously removing alcohol vapor from the upper part of said column, and continuously removing aqueous sulphuric acid from the base of said column, the surfaces of said column in contact with the liquid contents thereof being constructed of vitreous materials.

4. Process according to claim 3, in which the contents in the lower part of said column are heated by the direct introduction of steam.

5. Process of obtaining a secondary or tertiary alcohol from the corresponding alkyl sulphate, which comprises diluting said alkyl sulphate with water, holding the diluted alkyl sulphate at a temperature in excess of 50° C. and below the boiling point of the corresponding alcohol, thereby forming an alcohol sulphuric acid mixture, introducing the alcohol sulphuric acid mixture into the upper part of a stripping column, heating the contents in the lower part of said column, continuously removing alcohol vapor from the upper part of said column, continuously removing sulphuric acid from the base of said column, the surfaces of said column in contact with the liquid contents thereof being of vitreous materials.

6. Process according to claim 5, in which the contents in the lower part of said stripping column are heated by the direct introduction of steam.

7. Process of separating a secondary or tertiary alcohol from a mixture containing the said alcohol and aqueous sulphuric acid, which comprises maintaining a system including in counter-current communication a vertical series of zones containing liquid and vapor, supplying fresh alcohol sulphuric acid mixture to the upper part of said series, supplying heat to the lower part of said series, continuously removing alcohol vapor, and continuously removing aqueous sulphuric acid while retaining the liquid contents of the said zones by surfaces of a vitreous character and while holding said solution substantially exclusively in contact with surfaces of a vitreous character.

8. Process according to claim 7, in which the heat is supplied by the direct introduction of steam.

9. Process of obtaining a secondary or tertiary alcohol from the corresponding alkyl sulphate, which comprises diluting said alkyl sulphate with water, holding the diluted alkyl sulphate at a temperature in excess of 50° C. and below the boiling point of the corresponding alcohol, thereby forming an alcohol aqueous sulphuric acid mixture, maintaining a system comprising including in counter-current communication a vertical series of zones containing liquid and vapor, supplying the said alcohol sulphuric acid mixture to the upper part of said series, supplying heat to the lower part of said series, continuously removing alcohol vapor, and continuously removing aqueous sulphuric acid while retaining the liquid contents of said zones by surfaces of a vitreous character and while holding said solution substantially exclusively in contact with surfaces of a vitreous character.

10. Process according to claim 9, in which the heat is supplied by the direct introduction of steam.

BENJAMIN T. BROOKS.